US012204708B2

(12) United States Patent
Jin et al.

(10) Patent No.: US 12,204,708 B2
(45) Date of Patent: Jan. 21, 2025

(54) TOUCH PANEL AND TOUCH DEVICE WITH TOUCH PANEL (71) Applicant: WUHAN CHINA STAR OPTOELECTRONICS SEMICONDUCTOR DISPLAY TECHNOLOGY CO., LTD., Hubei (CN)

(72) Inventors: Zengjian Jin, Hubei (CN); Yalong Ma, Hubei (CN); Yanan Wang, Hubei (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 17/755,830

(22) PCT Filed: Apr. 15, 2022

(86) PCT No.: PCT/CN2022/087080
§ 371 (c)(1),
(2) Date: May 10, 2022

(87) PCT Pub. No.: WO2023/178761
PCT Pub. Date: Sep. 28, 2023

(65) Prior Publication Data
US 2024/0160305 A1    May 16, 2024

(30) Foreign Application Priority Data

Mar. 24, 2022 (CN) .......................... 202210297299.6

(51) Int. Cl.
G06F 3/041      (2006.01)
G06F 3/0354     (2013.01)
G06F 3/044      (2006.01)

(52) U.S. Cl.
CPC ........ *G06F 3/0412* (2013.01); *G06F 3/03545* (2013.01); *G06F 3/04164* (2019.05);
(Continued)

(58) Field of Classification Search
CPC .... G06F 3/0412; G06F 3/0445; G06F 3/0442; G06F 3/0446; G06F 3/04164; G06F 3/0443; G06F 3/035456
See application file for complete search history.

(56) References Cited

U.S. PATENT DOCUMENTS

2019/0294281 A1* 9/2019 Kim .................. H10K 50/8426

FOREIGN PATENT DOCUMENTS

CN    104765501 A    7/2015
CN    105677126 A    6/2016
(Continued)

OTHER PUBLICATIONS

International Search Report in International application No. PCT/CN2022/087080, mailed on Jan. 3, 2023.
(Continued)

*Primary Examiner* — Robert J Michaud
(74) *Attorney, Agent, or Firm* — PV IP PC; Wei Te Chung (57) ABSTRACT A touch panel and a touch device with the touch panel are provided. Each of plurality of touch electrodes of a substrate of the touch panel is led by a corresponding one of plurality of touch wires, and each row and each column of the plurality of touch electrodes share one detection channel through a corresponding one of the plurality of touch wires, and can detect a touch signal sensed by each of the plurality of touch electrodes, thereby increasing an area of the touch panel that can detect the touch signal, and enhancing a detection accuracy and a linearity of the touch panel.

18 Claims, 9 Drawing Sheets (52) U.S. Cl.
CPC .......... *G06F 3/0442* (2019.05); *G06F 3/0443* (2019.05); *G06F 3/0445* (2019.05); *G06F 3/0446* (2019.05)

(56) References Cited

FOREIGN PATENT DOCUMENTS

| | | | |
|---|---|---|---|
| CN | 112083836 A | * | 12/2020 |
| CN | 113031810 A | | 6/2021 |
| CN | 113126834 A | | 7/2021 |
| WO | 2020118979 A1 | | 6/2020 |

OTHER PUBLICATIONS

Written Opinion of the International Search Authority in International application No. PCT/CN2022/087080, mailed on Jan. 3, 2023.

* cited by examiner

TOUCH PANEL AND TOUCH DEVICE WITH TOUCH PANEL

FIELD OF DISCLOSURE

The present disclosure relates to the field of display technologies, and more particularly, to a touch panel and a touch device with the touch panel.

BACKGROUND OF DISCLOSURE

Figure 1:
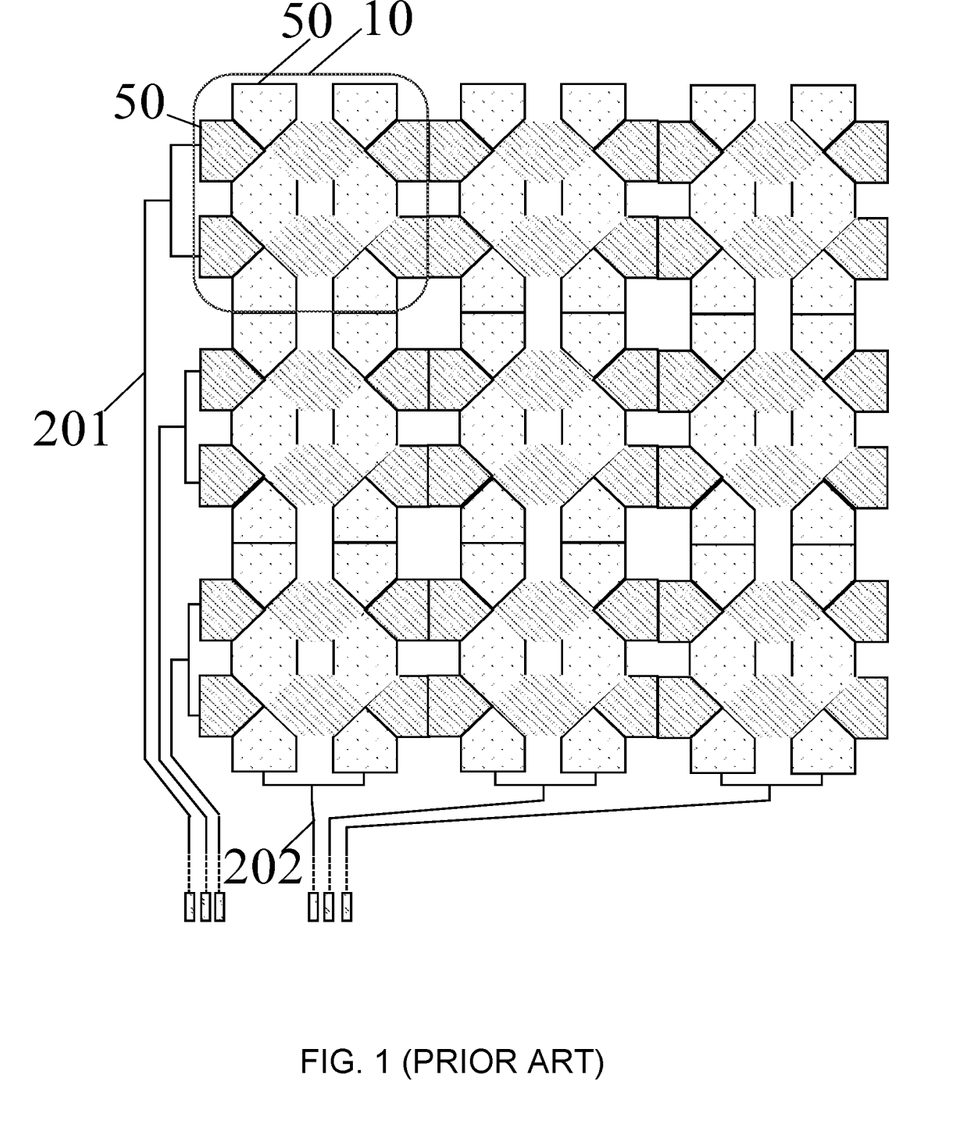
FIG. 1 is a schematic structural view of a touch panel in the prior art.

With continuous development of touch panel display technologies, active styluses and touch panels have been widely used as input devices in various fields. Current functions of capacitive active styluses are achieved through patterned conductive films of the touch panels to receive signals of the active styluses. However, since tips of the active styluses are much smaller compared to fingers, the active styluses have higher requirements for accuracy and linearity of the touch panels Currently, although a plurality of touch electrodes are disposed in each of plurality of unit areas of the touch panels, as shown in FIG. 1, usually only one horizontal touch wire 201 and only vertical touch wire 202 are led from the plurality of touch electrodes 50 in each of the plurality of unit areas 10, such that only an overall detection can be conducted to the plurality of touch electrodes 50 in each of the plurality of unit areas 10, which causes insufficient detection accuracy. Therefore, it is necessary to further enhance the accuracy and the linearity of the touch panels.

SUMMARY

In order to overcome the above-mentioned problems, the present invention provides a touch panel including: a substrate;
  a plurality of touch electrodes disposed on the substrate and intersecting vertically and horizontally;
  a plurality of touch wires disposed on the substrate, wherein each of the plurality of touch electrodes is respectively connected to a corresponding one of the plurality of touch wires; and
  a plurality of detection channels disposed outside the substrate, wherein each row of the plurality of touch electrodes are connected to a same one of the plurality of detection channels through corresponding ones of the plurality of touch wires, and each column of the plurality of touch electrodes are connected to a same one of the plurality of detection channels through corresponding ones of the plurality of touch wires.

In some embodiments, the plurality of touch electrodes include a plurality of main electrodes and a plurality of auxiliary electrodes, and the plurality of auxiliary electrodes are disposed around the plurality of main electrodes and are insulated from the plurality of main electrodes.

In some embodiments, at least a portion of the plurality of touch wires are provided with a plurality of time-division control switches.

In some embodiments, the plurality of time-division control switches on the plurality of touch wires connected to each of the plurality of detection channels are arranged to be turned on time-divisionally, so as to detect each of the rows and the columns of plurality of touch electrodes time-divisionally.

In some embodiments, the plurality of touch electrodes include the plurality of main electrodes and the plurality of auxiliary electrodes, and the plurality of auxiliary electrodes are disposed around the plurality of main electrodes and are insulated from the plurality of main electrodes.

In some embodiments, the auxiliary electrodes are disposed between two adjacent rows and/or columns of the plurality of main electrodes.

In some embodiments, a plurality rows of the plurality of auxiliary electrodes around each row of the plurality of main electrodes are connected to a same one of the plurality of touch wires, and/or a plurality of columns of the plurality of auxiliary electrodes around each column of the plurality of main electrodes are connected to a same one of the plurality of touch wires.

In some embodiments, the plurality of main electrodes and the plurality of auxiliary electrodes are disposed in a same layer, and the plurality of auxiliary electrodes are adopting jumper connections with the plurality of main electrodes at a plurality of intersections on a same layer.

In some embodiments, the plurality of touch wires connected to the plurality of main electrodes and the plurality of touch wires connected to the plurality of auxiliary electrodes are located in the same layer as the plurality of main electrodes and the plurality of auxiliary electrodes.

In some embodiments, the plurality of main electrodes and the plurality of auxiliary electrodes are disposed in different layers, the plurality of touch wires connected to the plurality of main electrodes are located in a same layer as the plurality of main electrodes, and the plurality of touch wires connected to the plurality of auxiliary electrodes and the plurality of auxiliary electrodes are located in another layer.

In addition, the present invention further provides a touch device including an active stylus and a touch panel. The touch panel is configured to detect a touch signal from the active stylus, and the touch panel including:
  a substrate;
  a plurality of touch electrodes disposed on the substrate and intersecting vertically and horizontally;
  a plurality of touch wires disposed on the substrate, wherein each of the plurality of touch electrodes is respectively connected to a corresponding one of the plurality of touch wires; and
  a plurality of detection channels disposed outside the substrate, wherein each row of the plurality of touch electrodes are connected to a same one of the plurality of detection channels through corresponding ones of the plurality of touch wires, and each column of the plurality of touch electrodes are connected to a same one of the plurality of detection channels through corresponding ones of the plurality of touch wires.

In some embodiments, at least a portion of the plurality of touch wires are provided with a plurality of time-division control switches.

In some embodiments, the plurality of time-division control switches on the plurality of touch wires connected to each of the plurality of detection channels are arranged to be turned on time-divisionally, so as to detect each of the rows and the columns of plurality of touch electrodes time-divisionally.

In some embodiments, the plurality of touch electrodes include the plurality of main electrodes and the plurality of auxiliary electrodes, and the plurality of auxiliary electrodes are disposed around the plurality of main electrodes and are insulated from the plurality of main electrodes.

In some embodiments, the auxiliary electrodes are disposed between two adjacent rows and/or columns of the plurality of main electrodes.

In some embodiments, a plurality rows of the plurality of auxiliary electrodes around each row of the plurality of main electrodes are connected to a same one of the plurality of touch wires, and/or a plurality of columns of the plurality of auxiliary electrodes around each column of the plurality of main electrodes are connected to a same one of the plurality of touch wires.

In some embodiments, the plurality of main electrodes and the plurality of auxiliary electrodes are disposed in a same layer, and the plurality of auxiliary electrodes are adopting jumper connections with the plurality of main electrodes at a plurality of intersections on a same layer.

In some embodiments, the plurality of touch wires connected to the plurality of main electrodes and the plurality of touch wires connected to the plurality of auxiliary electrodes are located in the same layer as the plurality of main electrodes and the plurality of auxiliary electrodes.

In some embodiments, the plurality of main electrodes and the plurality of auxiliary electrodes are disposed in different layers, the plurality of touch wires connected to the plurality of main electrodes are located in a same layer as the plurality of main electrodes, and the plurality of touch wires connected to the plurality of auxiliary electrodes and the plurality of auxiliary electrodes are located in another layer.

In the touch panel and a display device with the touch panel provided by an embodiment of the present invention, each of the plurality of touch electrodes of the substrate of the touch panel is led by the corresponding one of the plurality of touch wires, so that each of the rows of the plurality of touch electrodes on the substrate share one of the plurality of detection channels through corresponding ones of the plurality of touch wires, and each of the columns of the plurality of touch electrodes on the substrate share one of the plurality of detection channels through corresponding ones of the plurality of touch wires, thereby detecting a touch signal sensed by each of the plurality of touch electrodes. Compared with the prior art that only one horizontal touch wire is led from each row of a plurality of touch electrodes on a substrate, or only one vertical touch wire is led from each of the columns of the plurality of touch electrodes, the touch panel provided by an embodiment of the present invention can detect the touch signal sensed by each of the plurality of touch electrodes 50, which increases an area of the touch panel that can detect touch signals and enhances a detection accuracy and linearity of the touch panel, and makes the touch panel more suitable to be applied with an active stylus.

DETAILED DESCRIPTION OF PRESENT EMBODIMENTS

In order to make purposes, technical solutions, and effects of the present application clearer and more specific, the present application is further described in detail below with reference to the accompanying drawings and examples. It should be understood that the specific embodiments described herein are only used to explain the application, and are not used to limit the present application.

Figure 2:
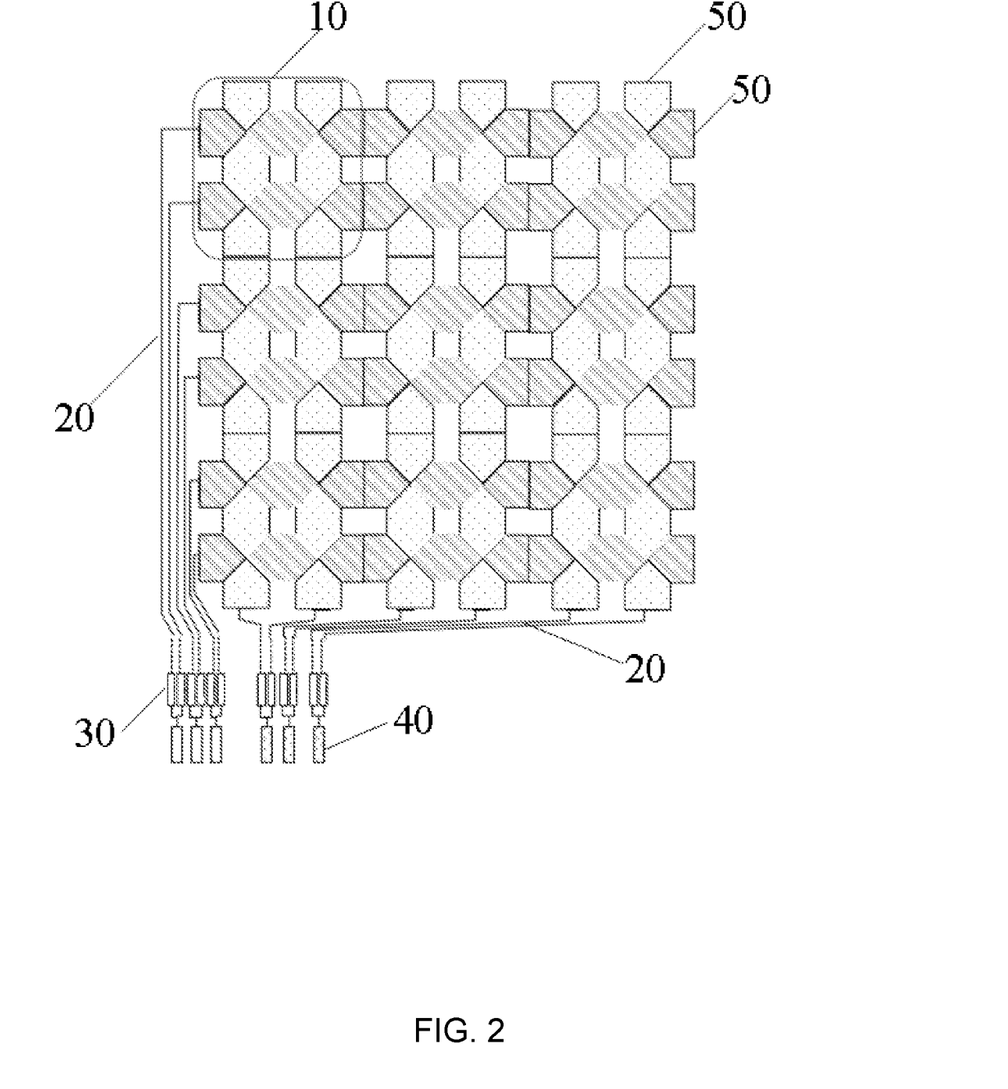
FIG. 2 is a schematic view of a first type of structure of a touch panel provided by an embodiment of the present invention.

Currently, precision requirements for capacitive active styluses are getting higher and higher, and a precision of a tip of a stylus less than 0.4 millimeters (mm) is even needed to be achieved. As shown in FIG. 2, an embodiment of the present invention provides a touch panel, including:
 a substrate (not shown in FIG. 2);
 a plurality of touch electrodes 50 disposed on the substrate and intersecting vertically and horizontally;
 a plurality of touch wires 20 disposed on the substrate, wherein each of the plurality of touch electrodes 50 is respectively connected to a corresponding one of the plurality of touch wires 20; and
 a plurality of detection channels 40 disposed outside the substrate, wherein each plurality of rows of touch electrodes 50 are connected to a same one of the plurality of detection channels 40 through corresponding ones of the plurality of touch wires 20, and each plurality of columns of touch electrodes 50 are connected to a same one of the plurality of detection channels 40 through corresponding ones of the plurality of touch wires 20.

In the touch panel provided by an embodiment of the present invention, each of the plurality of touch electrodes 50 of the substrate of the touch panel is led by the corresponding one of the plurality of touch wires 20, so that each row of the plurality of touch electrodes 50 on the substrate share one of the plurality of detection channels 40 through the corresponding ones of the plurality of touch wires 20, and each column of the plurality of touch electrodes 50 on the substrate share one of the plurality of detection channels 40, thereby detecting a touch signal sensed by each of the plurality of touch electrodes 50. Compared with the prior art that only one horizontal touch wire is led from each of the rows of a plurality of touch electrodes on a substrate, or only one vertical touch wire is led from each of the columns of the plurality of touch electrodes, the touch panel provided by an embodiment of the present invention can detect the touch signal sensed by each of the plurality of touch electrodes 50, which increases an area of the touch panel that can detect touch signals and enhances a detection accuracy and linearity of the touch panel, and makes the touch panel more suitable to be applied with an active stylus.

In the touch panel, each of the plurality of touch electrodes 50 of the substrate corresponds to an individual one of the plurality of touch wires 20. That is to say, each plurality of unit areas 10 of the substrate is subdivided, so that the touch signal sensed by each of the plurality of touch electrodes 50 can be detected, which is equivalent to reducing gaps between the plurality of touch electrodes 50, thereby enhancing an accuracy and the linearity for detecting the touch signals.

In some embodiments, at least a portion of the plurality of touch wires 20 are provided with a plurality of time-division control switches 30, and the plurality of time-division control switches 30 are configured for conducting all or a portion of the plurality of touch electrodes 50 in each of the plurality of unit areas 10 of the substrate, so as to flexibly select the plurality of touch electrodes 50 in each of the plurality of unit areas 10 according to the accuracy and the linearity required by the touch panel through detecting the touch signals sensed by all or a portion of the plurality of touch electrodes 50 in each of the plurality of unit areas 10.

Specifically, the plurality of time-division control switches 30 can each be a thin-film transistor, a gate of the thin-film transistor is connected to a control signal (not shown), a source of the thin-film transistor is connected to the plurality of touch electrodes 50, and a drain of the thin-film transistor is connected to one of the plurality of detection channels 40.

The plurality of time-division control switches 30 on the plurality of touch wires 20 correspondingly connected to each of the plurality of detection channels 40 are arranged to be time-divisionally turned on, so as to detect the touch signals sensed by the rows and the columns of the plurality of touch electrodes 50 tine-divisionally, so that a number of the plurality of detection channels 40 are no increased, and a cost of the touch panel and a number of processes are not increased.

Figure 3A:
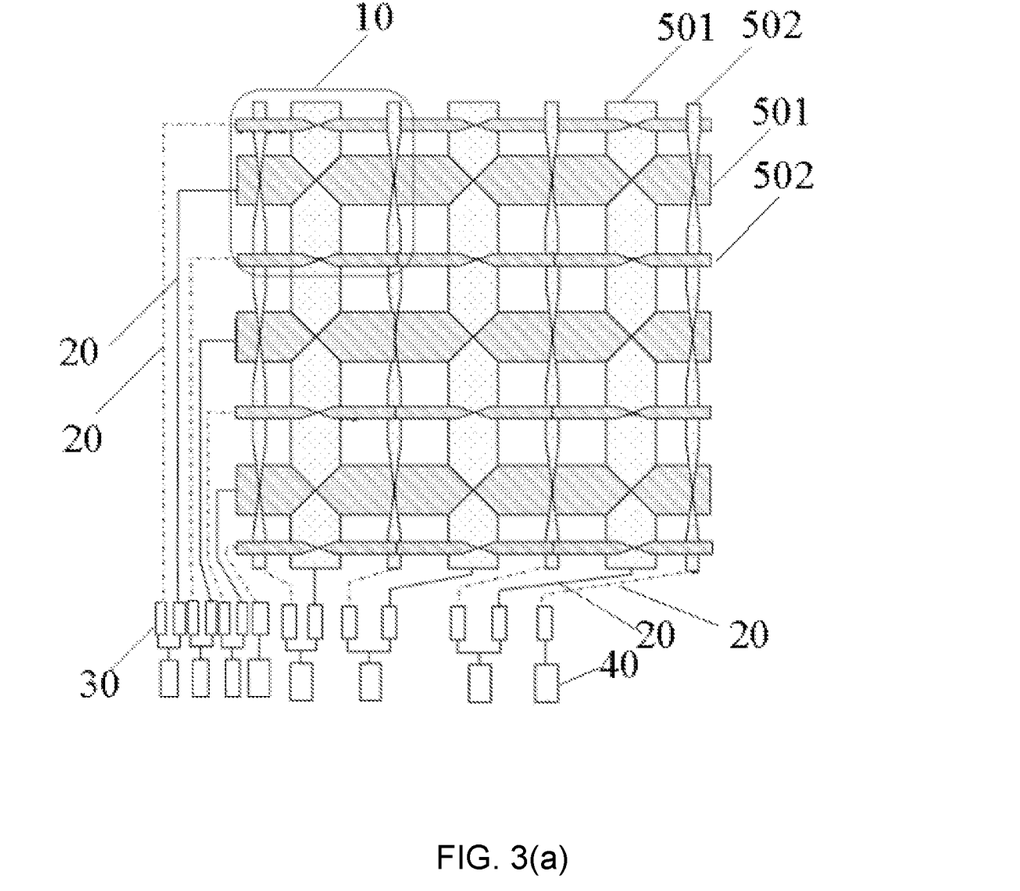
FIG. 3(a) is a schematic view of a first type of manner of connecting of a second type of structure of the touch panel provided by an embodiment of the present invention.
Figure 3B:
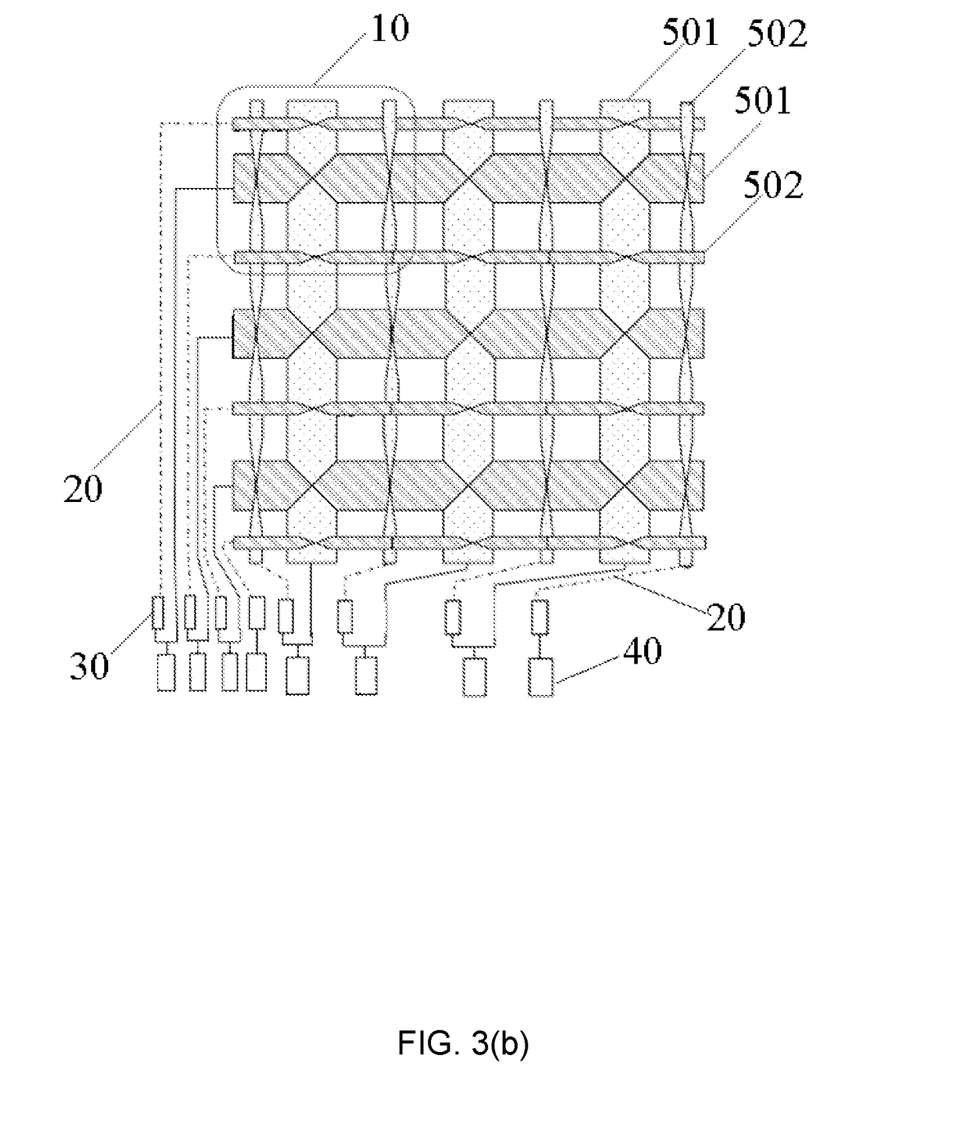
FIG. 3(b) is a schematic view of a second type of manner of connecting of the second type of structure of the touch panel provided by an embodiment of the present invention.
Figure 4A:
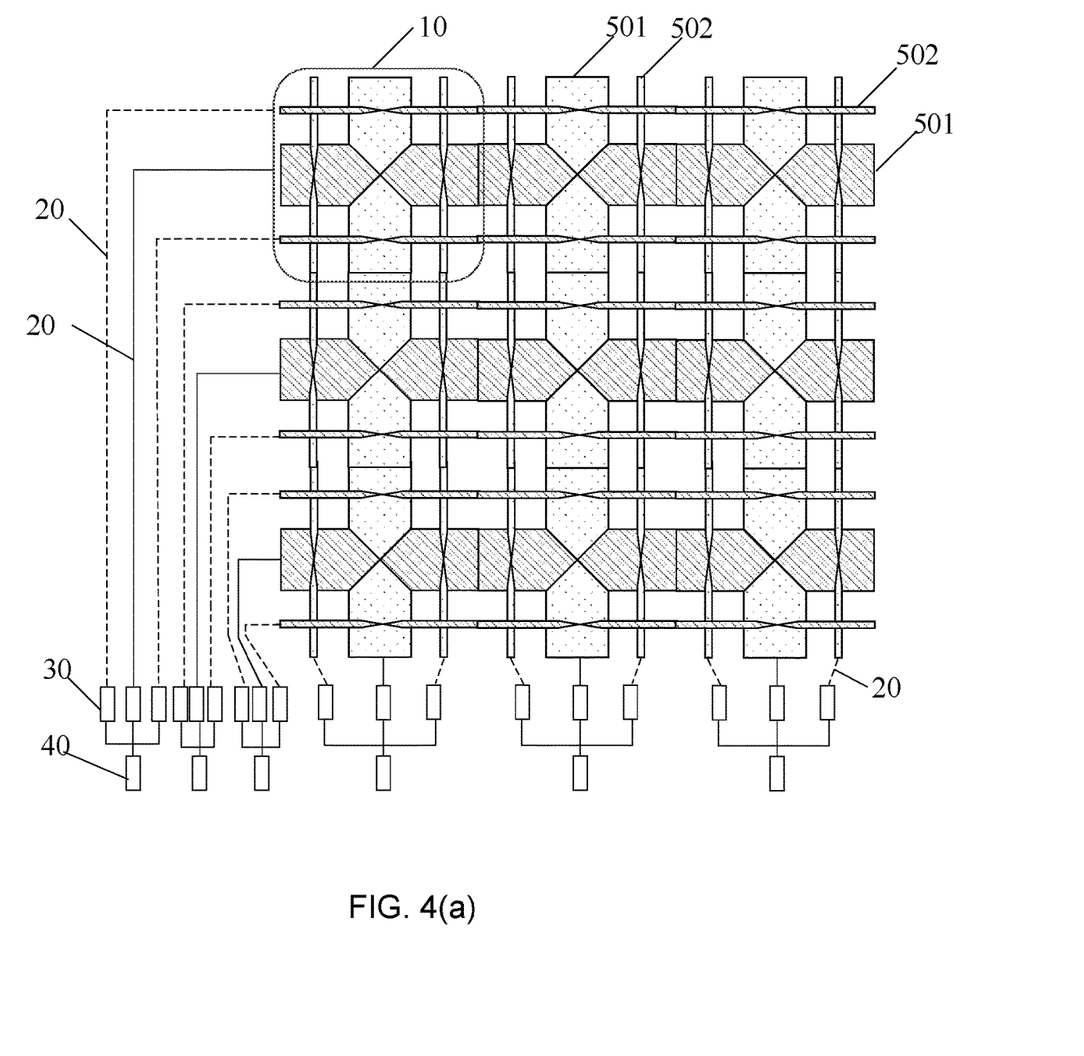
FIG. 4(a) is a schematic view of a first type of manner of connecting of a third type of structure of the touch panel provided by an embodiment of the present invention.
Figure 4B:
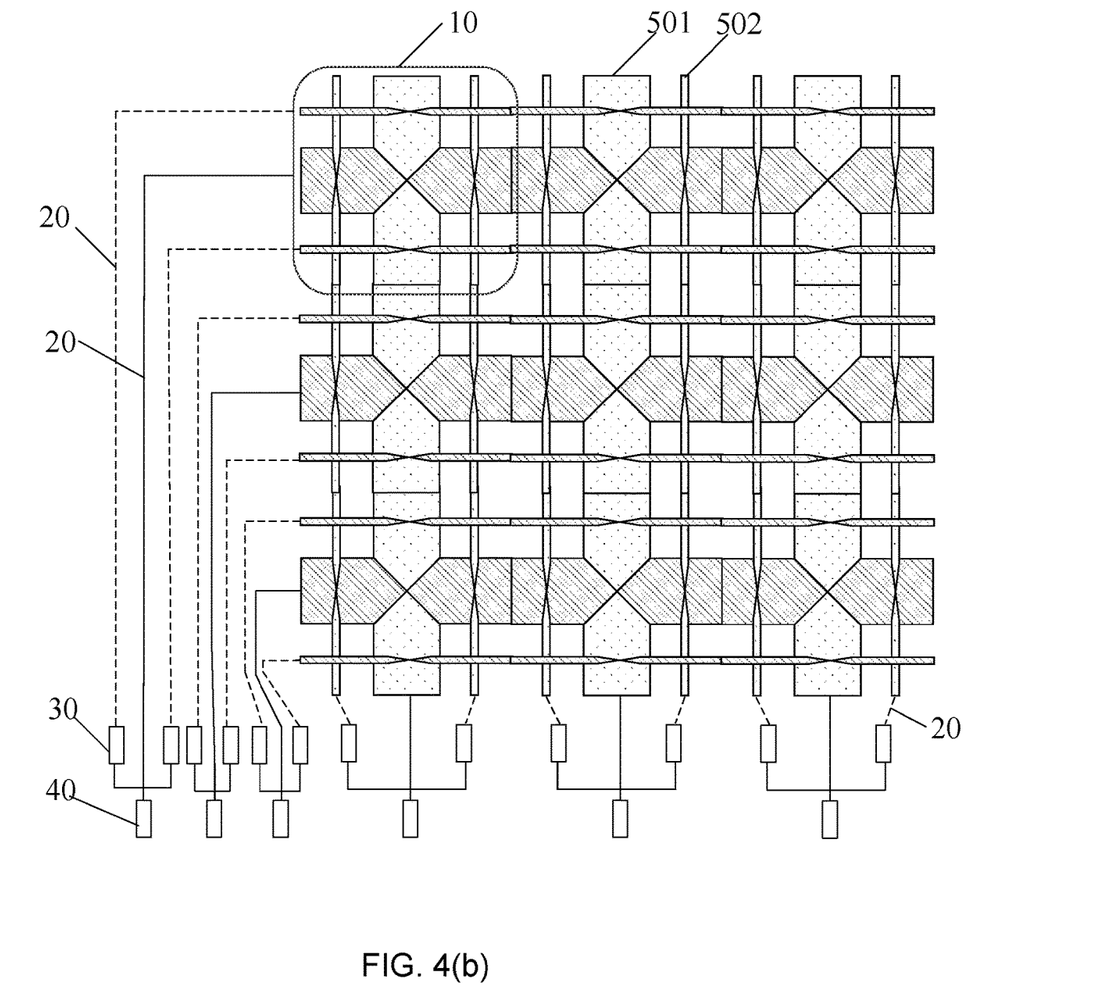
FIG. 4(b) is a schematic view of a second type of manner of connecting of the third type of structure of the touch panel provided by an embodiment of the present invention.
Figure 4C:
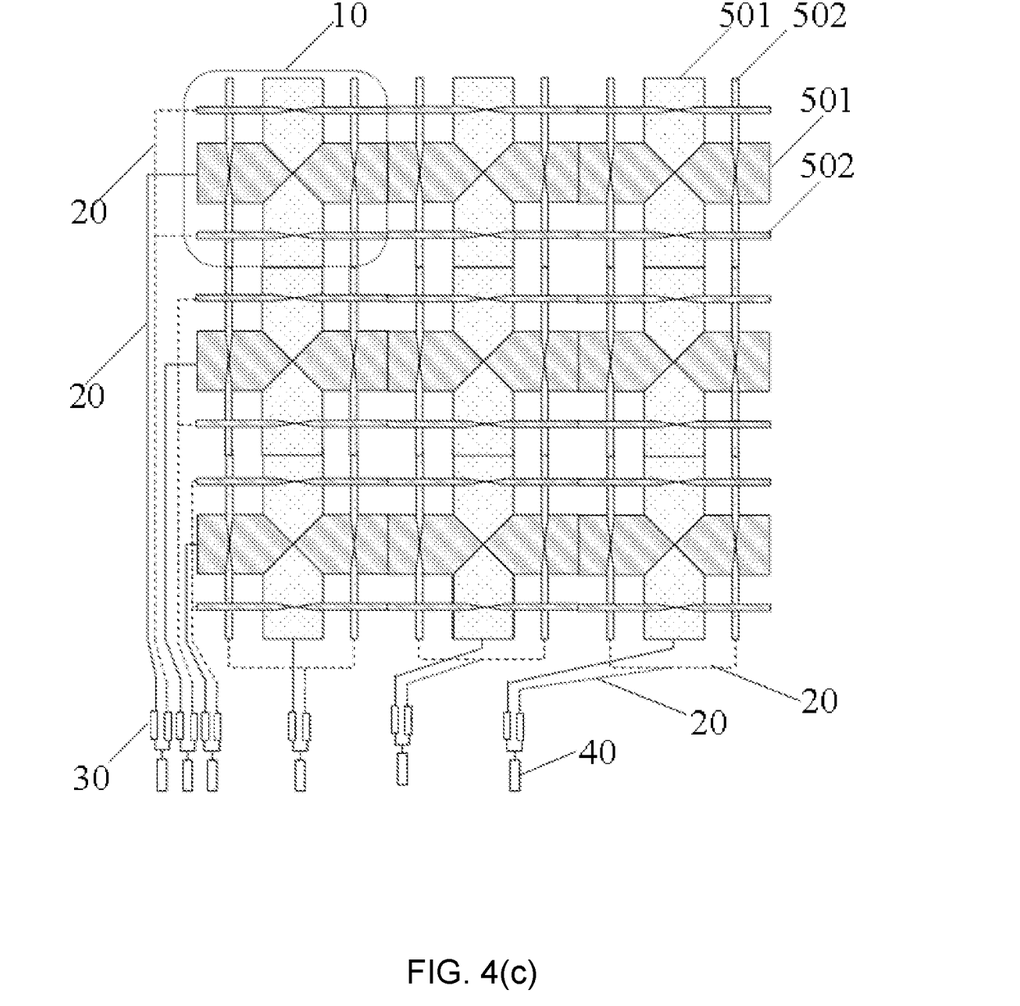
FIG. 4(c) is a schematic view of a third type of manner of connecting of the third type of structure of the touch panel provided by an embodiment of the present invention.
Figure 4D:
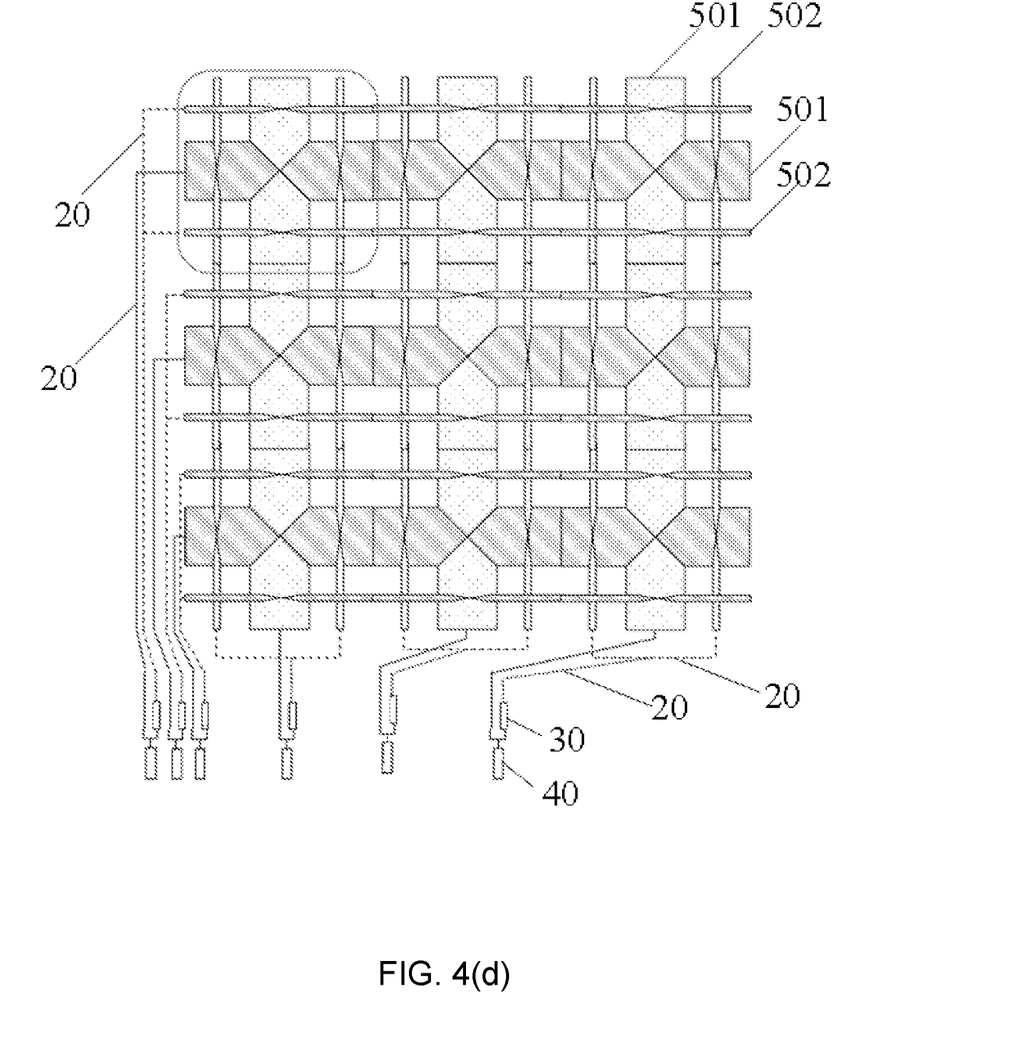
FIG. 4(d) is a schematic view of a fourth type of manner of connecting of the third type of structure of the touch panel provided by an embodiment of the present invention.

According to the above embodiments, as shown in FIG. 3(*a*), FIG. 3(*b*), FIG. 4(*a*), FIG. 4(*b*), FIG. 4(*c*), and FIG. 4(*d*), the plurality of touch electrodes 50 include a plurality of main electrodes 501 and a plurality of auxiliary electrodes 502, and the plurality of auxiliary electrodes 502 are arranged around the plurality of main electrodes 501 and are insulated from the plurality of main electrodes 501.

Specifically, in an embodiment of the present invention, the plurality of auxiliary electrodes 502 are arranged around the plurality of main electrodes 501, and each of the plurality of main electrodes 501 and each of the plurality of auxiliary electrodes 502 are respectively connected to at least one of the plurality of touch wires 20, so that the substrate of the touch panel is not only distributed with the plurality of main electrodes 501, but also distributed with the plurality of auxiliary electrodes 502 around the plurality of main electrodes 501. Each of the plurality of main electrodes 501 and each of the plurality of auxiliary electrodes 502 can detect the touch signals through at least one of the plurality of touch wires 20. Therefore, the plurality of main electrodes 501 and the plurality of auxiliary electrodes 502 jointly detect the touch signals, which can greatly increase an actual sensing area of the touch panel, increase a sensing quantity, and enhance the detection accuracy and the linearity of the active stylus.

In this embodiment of the present invention, through the main plurality of electrodes 501 and the plurality of auxiliary electrodes 502 arranged around and insulated from the plurality of main electrodes 501 on the substrate, and both the plurality of main electrodes 501 and the plurality of auxiliary electrodes 502 are led by corresponding ones of the plurality of touch wires 20, the plurality of main electrodes 501 and the plurality of auxiliary electrodes 502 can serve as the plurality of touch electrodes 50 to detect the touch signals, which greatly increases the actual sensing area of the touch panel, increases the sensing quantity, and provides better sensing of the touch signals of the active stylus, thereby enhancing the detection accuracy and the linearity of the active stylus.

It should be noted that the plurality of auxiliary electrodes 502 should be distributed around the plurality of main electrodes 501 as evenly as possible, so that the detection accuracy and the linearity of each area of the touch panel are substantially equivalent.

It should also be noted that the touch panel can be a self-capacitive touch panel or a mutual capacitive touch panel. When the touch panel is the self-capacitive touch panel, the plurality of main electrodes 501 are grounded. When the touch panel is the mutual capacitive touch panel, each of the plurality of main electrodes 501 includes a transmitting electrode and a receiving electrode.

Furthermore, each row of the plurality of auxiliary electrodes 502 and each column of the plurality of auxiliary electrodes 502 in each of the plurality of unit areas 10 of the substrate can be respectively connected to a corresponding one of the plurality of touch wires 20, as shown in FIG. 3(*a*), FIG. 3(*b*), FIG. 4(*a*) or FIG. 4(*b*); or, the columns of the plurality of auxiliary electrodes 502 in each of the plurality of unit areas 10 of the substrate share one of the plurality of touch wires 20, and the rows of the plurality of auxiliary electrodes 502 in each of the plurality of unit areas 10 of the substrate share one of the plurality of touch wires 20, as shown in FIG. 4(*c*) or FIG. 4(*d*).

Furthermore, an application scenario of the touch panel can only be a finger touch control or only be an active stylus touch control. Since an area of a finger is way greater than a tip of an active stylus, an accuracy required for the finger touch control is way lower than an accuracy required for the active stylus touch control. Therefore, only a portion of the plurality of time-division control switches 30 on the plurality of touch wires 20 connected to the plurality of main electrodes 501 or the plurality of auxiliary electrodes 502 can be selected to be conducted according to whether the finger touch control or the active stylus touch control applies, so that only a portion of the plurality of main electrodes 501 or the plurality of auxiliary electrodes 502 are applied to sense the touch signals. At this time, another portion of the plurality of time-division control switches 30 on the plurality of touch wires 20 connected to the plurality of main electrodes 501 and the plurality of auxiliary electrodes 502 are disconnected, so that another portion of the plurality of main electrodes 501 and the plurality of auxiliary electrodes 502 are disconnected, so as to achieve a purpose of power saving.

Specifically, during the finger touch control, conducting only a portion of the plurality of touch electrodes 50 can be optional, and since a coverage area of the plurality of main electrodes 501 is generally greater than a coverage area of the plurality of auxiliary electrodes 502, during the finger touch control, generally only the plurality of main electrodes 501 are conducted. Therefore, in order to simplify a structure, the plurality of main electrodes 501 are not provided with the plurality of time-division control switches 30 to make the plurality of main electrodes 501 remain conducted continuously, and only the plurality of auxiliary electrodes 502 are provided with the plurality of time-division control switches 30, so that the plurality of auxiliary electrodes 502 can be disconnected during the finger touch control, and only the plurality of main electrodes 501 are conducted. Optionally, structures are those shown in FIG. 3(*b*), FIG. 4(*b*), and FIG. 4(*d*). When an active stylus touches, the plurality of time-division control switches 30 on the plurality of touch wires 20 connected to the plurality of main electrodes 501 and the plurality of auxiliary electrodes 502 can all be conducted, so that the plurality of main electrodes 501 and the plurality of auxiliary electrodes 502 simultaneously serve as the plurality of touch electrodes 50, which greatly increases the actual sensing area of the touch panel, and provides better sensing of the touch signals of the active stylus, thereby enhancing the detection accuracy and the linearity of the active stylus. Optionally, structures are those shown in FIG. 3(a), FIG. 3(b), FIG. 4(a), FIG. 4(b), FIG. 4(c), and FIG. 4(d).

It can be understood that, since the plurality of main electrodes 501 are generally disposed vertically and horizontally on the substrate, when the plurality of auxiliary electrodes 502 are disposed around the plurality of main electrodes 501, the plurality of auxiliary electrodes 502 can also be disposed vertically and horizontally, so that the plurality of auxiliary electrodes 502 are disposed between two adjacent rows of the plurality of main electrodes 501 or between two adjacent columns of the plurality of main electrodes 501, as shown in FIG. 3(a), FIG. 3(b), FIG. 4(a), FIG. 4(b), FIG. 4(c), or FIG. 4(d).

It should be noted that a number of the plurality of main electrodes 501 and a number of the plurality of auxiliary electrodes 502 can be adjusted. Therefore, only a single auxiliary electrode 502 or a plurality of auxiliary electrodes 502 can be disposed between two adjacent rows and/or two adjacent columns of the plurality of main electrodes 501.

It should also be noted that an area of the plurality of main electrodes 501 and an area of the plurality of auxiliary electrodes 502 can also be adjusted. That is to say, the area of the plurality of main electrodes 501 and the area of the plurality of auxiliary electrodes 502 can be adjusted according to an area of the display panel, and the area of the plurality of auxiliary electrodes 502 can also be adjusted according to the area of the plurality of main electrodes. Generally speaking, the area of the plurality of auxiliary electrodes 502 is not greater than the area of the plurality of main electrodes 501.

It should be noted that, each of the plurality of unit areas 10 refers to a unit sensing area of the substrate, and a size and shape of each of the plurality of unit areas 10 can be set arbitrarily. In an embodiment of the present invention, the number and the area of the main plurality of electrodes 501 and the number and the area of the plurality of auxiliary electrodes 502 can be adjusted to increase the number of the plurality of main electrodes 501 and the number of the plurality of auxiliary electrodes 502 in each of the plurality of unit areas 10 of the display panel. For example, each of the plurality of unit areas 10 of the display panel only including one horizontal main electrode and one vertical main electrode can be increased to include two horizontal main electrodes and two vertical main electrodes. That is to say, an area occupied by a touch unit composed of the one horizontal main electrode and the one vertical main electrode is the same as an area occupied by a current touch unit composed of the two horizontal main electrodes and the two vertical main electrodes. In addition, the plurality of auxiliary electrodes 502 are disposed around each of the plurality of main electrodes 501, so that the number of the plurality of auxiliary electrodes within each of the plurality of unit areas 10 is also increased, thereby reducing distances between adjacent ones of the plurality of main electrodes 501 and/or the plurality of auxiliary electrodes 502, and increasing the accuracy and the linearity of the touch panel detecting and determining the active stylus.

In the touch panel provided by an embodiment of the present invention, the plurality of touch wires 20 lead out the touch signals sensed by the plurality of main electrodes 501 and the plurality of auxiliary electrodes 502 and then connect to a touch integrated chip (TIC) through the plurality of detection channels 40 (not shown in the figures). The touch integrated chip collects and analyzes the touch signals to determine a position of a touch point. Since a number of channels of the touch integrated chip is limited, in order not to increase the channels of the touch integrated chip, the touch panel is based on a multi-channel time-division control circuit (demux circuit), so that the main plurality of electrodes 501 and the plurality of auxiliary electrodes 502 that are surrounding are jointly connected to one of the plurality of detection channels 40 through the corresponding one of the plurality of touch wires 20, and through the plurality of time-division control switches 30 on the plurality of touch wires 20 being correspondingly connected to the plurality of main electrodes 501 and the plurality of auxiliary electrodes 502, conductions of the plurality of main electrodes 501 and the plurality of auxiliary electrodes 502 are controlled time-divisionally. Therefore, the touch signals sensed by the plurality of main electrodes 501 and the plurality of auxiliary electrodes 502 are detected time-divisionally.

The plurality of main electrodes 501 and the plurality of auxiliary electrodes 502 that are surrounding are jointly connected to one of the plurality of detection channels 40. Specifically, each of the plurality of detection channels 40 is connected to each row of the plurality of main electrodes 501 and at least one of the plurality of auxiliary electrodes 502 adjacent to and parallel to one row of the plurality of main electrodes 501, so that each of the rows of the plurality of main electrodes 501 and at least one of the plurality of auxiliary electrodes 502 adjacent to and parallel to the one row of the plurality of main electrodes 501 are connected to one of the plurality of detection channels 40. Similarly, it can also be: each of the plurality of detection channels 40 is connected to each column of the plurality of main electrodes 501 and at least one of the plurality of auxiliary electrodes 502 adjacent to and parallel to one column of the plurality of main electrodes 501, so that each of the columns of the plurality of main electrodes 501 and at least one of the plurality of auxiliary electrodes 502 adjacent to and parallel to the one column of the plurality of main electrodes 501 are connected to one of the plurality of detection channels 40. Therefore, each of the plurality of main electrodes 501 and each of the plurality of auxiliary electrodes 502 are connected to the touch integrated chip through corresponding ones of the detection channels 40.

It should be noted that projections of the plurality of main electrodes 501 and projections of the plurality of auxiliary electrodes 502 can intersected, but the plurality of main electrodes 501 and the plurality of auxiliary electrodes 502 are insulated from each other at intersections of the projections to prevent the plurality of main electrodes 501 and the plurality of auxiliary electrodes 502 from being short-circuited.

Figure 5:
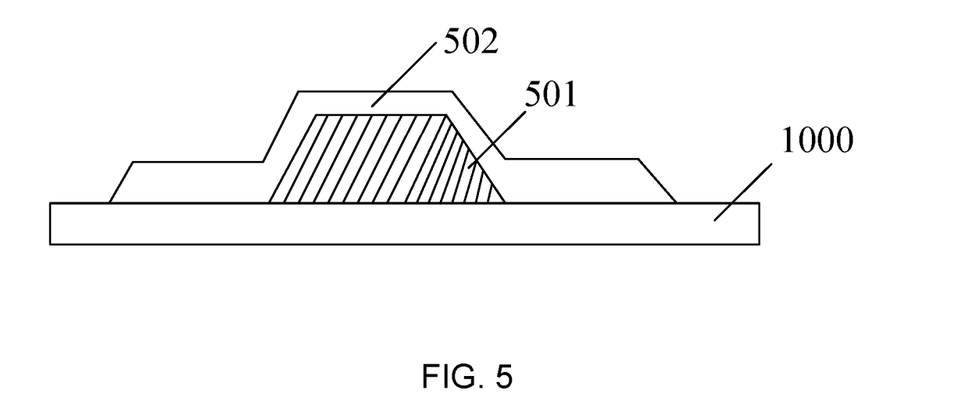
FIG. 5 is a schematic structural view of an auxiliary electrode adopting overlapping connection at an intersection in a same layer a main electrode provided by an embodiment of the present invention.

Accordingly, when the plurality of main electrodes 501 and the plurality of auxiliary electrodes 502 are disposed in a same layer, the plurality of auxiliary electrodes 502 are adopting jumper connections at intersections with the plurality of main electrodes 501. That is to say, as shown in FIG. 5, on the substrate 1000, the plurality of auxiliary electrodes 502 can be bent at the intersections with the plurality of main electrodes 501, so that the plurality of auxiliary electrodes 502 and the plurality of main electrodes 501 are not in contact at the intersections, so that the plurality of auxiliary electrodes 502 and the plurality of main electrodes 501 can be insulated from each other at the intersections. It can be understood that the plurality of touch wires 20 connected to the plurality of main electrodes 501 and the plurality of touch wires 20 connected to the plurality of auxiliary electrodes 502 are also located in the same layer as the plurality of main electrodes 501 and the plurality of auxiliary electrodes 502.

In addition, when the plurality of main electrodes 501 and the plurality of auxiliary electrodes 502 are disposed in different layers, the plurality of touch wires 20 connected to the plurality of main electrodes 501 and plurality of the main electrodes 501 are located in a same layer, the plurality of touch wires 20 connected to the plurality of auxiliary electrodes 502 and the plurality of auxiliary electrodes 502 are located in another layer, and then the plurality of touch wires 20 connected to the plurality of main electrodes 501 and the plurality of touch wires 20 connected to the plurality of auxiliary electrodes 502 are extended outside the display panel for connection.

Based on the above embodiments, embodiments of the present invention further provide a touch device including an active stylus and the above-mentioned touch panel. The touch panel is configured for detecting a touch signal of the active stylus. The touch device has a same structure and beneficial effects as the touch panel. Since the touch panel has been described in detail in the above embodiments, it will not be reiterated herein.

It can be understood that those having ordinary skills of the art may easily contemplate various changes and modifications of the technical solution and technical ideas of the present invention and all these changes and modifications are considered within the protection scope of right for the present invention.

What is claimed is:

1. A touch panel, comprising:
   a substrate;
   a plurality of touch electrodes disposed on the substrate in a vertical direction perpendicular to an upper surface of the substrate, the plurality of touch electrodes comprises one or more rows of the touch electrodes and one or more columns of the touch electrodes intersecting each other in a plan view of the touch panel;
   a plurality of touch wires disposed on the substrate in the vertical direction, wherein each of the plurality of touch electrodes is respectively connected to a corresponding one of the plurality of touch wires; and
   a plurality of detection channels disposed outside the substrate in the plan view, wherein one of the plurality of touch electrodes in each of the one or more rows and at least one of the plurality of touch electrodes in at least one of the one or more rows other than the row are connected to a same one of the plurality of detection channels through corresponding ones of the plurality of touch wires, and one of the plurality of touch electrodes in each of the one or more columns and at least one of the plurality of touch electrodes in at least one of the one or more columns other than the column are connected to a same one of the plurality of detection channels through corresponding ones of the plurality of touch wires.

2. The touch panel according to claim 1, wherein each of at least a portion of the plurality of touch wires is provided with a time-division control switch.

3. The touch panel according to claim 2, wherein the time-division control switch on the plurality of touch wires connected to each of the plurality of detection channels is arranged to be turned on time-divisionally, so as to detect each of the rows and the columns of plurality of touch electrodes time-divisionally.

4. The touch panel according to claim 1, wherein the plurality of touch electrodes comprise a plurality of main electrodes arranged in rows and columns and a plurality of auxiliary electrodes arranged in rows and columns, and the plurality of auxiliary electrodes are disposed around the plurality of main electrodes and are insulated from the plurality of main electrodes.

5. The touch panel according to claim 4, wherein the auxiliary electrodes are disposed between two adjacent ones of the rows or columns of the plurality of main electrodes.

6. The touch panel according to claim 4, wherein a plurality rows of the plurality of auxiliary electrodes around each of the rows of the plurality of main electrodes are connected to a same one of the plurality of touch wires, or a plurality of columns of the plurality of auxiliary electrodes around each of the columns of the plurality of main electrodes are connected to a same one of the plurality of touch wires.

7. The touch panel according to claim 4, wherein the plurality of main electrodes and the plurality of auxiliary electrodes are disposed in a same layer, and the plurality of auxiliary electrodes are jumper connected with the plurality of main electrodes at a plurality of intersections on a same layer.

8. The touch panel according to claim 7, wherein the plurality of touch wires connected to the plurality of main electrodes and the plurality of touch wires connected to the plurality of auxiliary electrodes are located in the same layer as the plurality of main electrodes and the plurality of auxiliary electrodes.

9. The touch panel according to claim 4, wherein the plurality of main electrodes and the plurality of auxiliary electrodes are disposed in different layers, the plurality of touch wires connected to the plurality of main electrodes are located in a same layer as the plurality of main electrodes, and the plurality of touch wires connected to the plurality of auxiliary electrodes and the plurality of auxiliary electrodes are located in another layer.

10. A touch device comprising an active stylus and a touch panel, the touch panel is configured to detect a touch signal from the active stylus, the touch panel comprising:
   a substrate;
   a plurality of touch electrodes disposed on the substrate in a vertical direction perpendicular to an upper surface of the substrate, the plurality of touch electrodes comprises one or more rows of the touch electrodes and one or more columns of the touch electrodes intersecting each other in a plan view of the touch panel;
   a plurality of touch wires disposed on the substrate in the vertical direction, wherein each of the plurality of touch electrodes is respectively connected to a corresponding one of the plurality of touch wires; and
   a plurality of detection channels disposed outside the substrate in the plan view, wherein one of the plurality of touch electrodes in each of the one or more rows and at least one of the plurality of touch electrodes in at least one of the one or more rows other than the row are connected to a same one of the plurality of detection channels through corresponding ones of the plurality of touch wires, and one of the plurality of touch electrodes in each of the one or more columns and at least one of the plurality of touch electrodes in at least one of the one or more columns other than the column are connected to a same one of the plurality of detection channels through corresponding ones of the plurality of touch wires.

11. The touch device according to claim 10, wherein each of at least a portion of the plurality of touch wires is provided with a time-division control switch.

12. The touch device according to claim 11, wherein the time-division control switch on the plurality of touch wires connected to each of the plurality of detection channels is arranged to be turned on time-divisionally, so as to detect each of the rows and the columns of plurality of touch electrodes time-divisionally.

13. The touch device according to claim 10, wherein the plurality of touch electrodes comprise a plurality of main electrodes arranged in rows and columns and a plurality of auxiliary electrodes arranged in rows and columns, and the plurality of auxiliary electrodes are disposed around the plurality of main electrodes and are insulated from the plurality of main electrodes.

14. The touch device according to claim 13, wherein the auxiliary electrodes are disposed between two adjacent ones of the rows or columns of the plurality of main electrodes.

15. The touch device according to claim 13, wherein a plurality rows of the plurality of auxiliary electrodes around each of the rows of the plurality of main electrodes are connected to a same one of the plurality of touch wires, or a plurality of columns of the plurality of auxiliary electrodes around each of the columns of the plurality of main electrodes are connected to a same one of the plurality of touch wires.

16. The touch device according to claim 13, wherein the plurality of main electrodes and the plurality of auxiliary electrodes are disposed in a same layer, and the plurality of auxiliary electrodes are jumper connected with the plurality of main electrodes at a plurality of intersections on a same layer.

17. The touch device according to claim 16, wherein the plurality of touch wires connected to the plurality of main electrodes and the plurality of touch wires connected to the plurality of auxiliary electrodes are located in the same layer as the plurality of main electrodes and the plurality of auxiliary electrodes.

18. The touch device according to claim 13, wherein the plurality of main electrodes and the plurality of auxiliary electrodes are disposed in different layers, the plurality of touch wires connected to the plurality of main electrodes are located in a same layer as the plurality of main electrodes, and the plurality of touch wires connected to the plurality of auxiliary electrodes and the plurality of auxiliary electrodes are located in another layer.

* * * * *